United States Patent
Christel

(10) Patent No.: US 10,604,620 B2
(45) Date of Patent: Mar. 31, 2020

(54) PROCESS FOR SOLID-STATE POLYCONDENSATION

(71) Applicant: Bühler Thermal Processes AG, Oberbüren (CH)

(72) Inventor: Andreas Christel, Zuzwil (CH)

(73) Assignee: Polymetrix AG, Oberbüren (CH)

( * ) Notice: Subject to any disclaimer, the term of this patent is extended or adjusted under 35 U.S.C. 154(b) by 600 days.

(21) Appl. No.: 14/367,390

(22) PCT Filed: Dec. 18, 2012

(86) PCT No.: PCT/EP2012/075905
§ 371 (c)(1),
(2) Date: Jun. 20, 2014

(87) PCT Pub. No.: WO2013/092554
PCT Pub. Date: Jun. 27, 2013

(65) Prior Publication Data
US 2015/0031850 A1    Jan. 29, 2015

(30) Foreign Application Priority Data

Dec. 22, 2011  (EP) ..................... 11195069

(51) Int. Cl.
*C08G 63/181* (2006.01)
*C08G 63/80* (2006.01)
*C08G 63/78* (2006.01)
*C08G 63/183* (2006.01)
*B01J 10/00* (2006.01)

(52) U.S. Cl.
CPC ............ *C08G 63/181* (2013.01); *B01J 10/00* (2013.01); *C08G 63/183* (2013.01); *C08G 63/785* (2013.01); *C08G 63/80* (2013.01)

(58) Field of Classification Search
CPC .. C08G 63/181; C08G 63/183; C08G 63/785; C08G 63/80; B01J 10/00
See application file for complete search history.

(56) References Cited

U.S. PATENT DOCUMENTS

| 4,532,319 | A |   | 7/1985 | Wendling |
| 5,708,124 | A | * | 1/1998 | Al Ghatta ............. C08G 63/80 528/272 |

FOREIGN PATENT DOCUMENTS

| DE | 102004041370 | 3/2006 |
| DE | 102005016146 | 3/2006 |
| EP | 0284544 | 9/1988 |
| EP | 0810250 | 12/1997 |
| WO | 2005/087838 | 9/2005 |

OTHER PUBLICATIONS

Aharoni "Industrial-Scale Production of Polyesters" Chapter 2.Published on Jan. 28, 2005.*
Aharoni "Industrial-Scale Production of Polyesters" Chapter 2 Abstract published Jan. 28, 2005.*
Ma et al."Solid-state polymerization of PET: influence of nitrogen sweep and high vacuum", Polymer, 2003, pp. 4085-4096.*
Huang et al "Solid-phase polymerization mechanism of poly(ethylene terephthalate) affected by gas flow velocity and particle size",Polymer vol. 39 No. 26, pp. 6991-6999, 1998.*
B.Culbert et al "Continuous Solid-State Polycondensation of Polyesters", Modern Polyesters , Chapter 4, pp. 143-194, 2003.*

* cited by examiner

*Primary Examiner* — Ling Siu Choi
*Assistant Examiner* — Gennadiy Mesh
(74) *Attorney, Agent, or Firm* — Davis & Bujold PLLC; Michael J. Bujold

(57) ABSTRACT

A method and an apparatus for solid-state polycondensation of polyesters, preferably polyethylene terephthalate and/or copolymers thereof. The method and apparatus are both characterized by a solid-state polycondensation being performed with polyester prepolymer particles in a reaction chamber in which an absolute pressure is in the range from 10 mbar to 200 mbar, and a process gas flow in the range of an R-value of 0.005 to 0.05. The polycondensation is carried out over a time of from 2 to 30 hours and at a temperature of from 180° C. to 5° below a crystalline melting point of the polyester prepolymer particles in order to achieve an intrinsic viscosity of from 0.70 to 0.95 dl/g. The R value is defined as a ratio of an hourly amount of process gas (in kg) flowing through the reaction space to an hourly amount of polymer (in kg) flowing through the reaction space:

$$R = \frac{m(gas)/h}{m(polymer)/h}.$$

8 Claims, 4 Drawing Sheets

PROCESS FOR SOLID-STATE POLYCONDENSATION

The present invention relates to a process for the solid-state polycondensation of polyesters, in particular of polyethylene terephthalate or copolymers thereof.

Polyesters are usually prepared from corresponding monomers (especially dicarboxylic acids and diols) by a polycondensation reaction in the melt. Due to the nature of the process, only a polyester having a particular maximum molecular weight can be prepared by the melt polycondensation. In order to prepare polyesters having a relatively high molecular weight as is required for various industrial applications, the low molecular weight polyester (also referred to as prepolymer) obtained from the melt polycondensation is subjected to a solid-state polycondensation. In the solid state, essentially no thermal degradation of the polymer occurs.

In the solid-state polycondensation (SSP for short), the low molecular weight polyester is heated to a temperature of from 180° C. to a maximum of 5° C. below its melting point. The SSP reaction has been comprehensively described in the literature (e.g. Scheirs/Long (editors), Modern Polyesters, Wiley 2003, isb. pp. 153-244).

Since the SSP reaction is an equilibrium reaction, the by-products of the SSP reaction (water, monomers, such as ethylene glycol, by-products such as acetaldehyde or oligomers) have to be removed effectively from the reaction vessel in order to achieve a desired high molecular weight of the polyester. The removal of these by-products is effected by application of a reduced pressure or with the aid of an inert gas such as nitrogen flowing through the reaction vessel in order to carry the by-products out of the reaction vessel.

Both methods have disadvantages. Efficient removal of the by-products from the reaction vessel requires a large amount of inert gas which has to be conveyed through the reaction space. Although R values of from 0.1 to 0.6 or 0.7 are disclosed in the prior art (U.S. Pat. No. 3,756,990; EP-0 810 250 B1), where the R value is defined as the ratio of hourly amount of gas flowing through the reaction space to hourly amount of polymer flowing through the reaction space, far higher R values are generally employed. U.S. Pat. No. 4,876,326 discloses an SSP reaction in which the reaction can be carried out at a lower R value under specific conditions (cycled gas stream, but in particular the use of a polymer in the form of porous particles). However, this process is limited to the specific conditions described therein and thus its applicability is restricted. The amounts of gas disclosed as necessary in the prior art are thus so large that, for cost reasons (a loss of such a large amount of inert gas is economically unacceptable), a complicated gas purification has to be provided.

For efficient removal of by-products by application of a reduced pressure, sufficiently intensive reduced pressure conditions have to be generated and maintained in the reaction space. According to Scheirs/Long (editors), Modern Polyesters, Wiley 2003, p. 234, the lowest possible pressure is necessary in the reaction space; the process is normally carried out at a pressure of 0.2 mbar. WO 2007/116022 discloses carrying out an SSP reaction under conditions of from 0.01 to 1 mbar. U.S. Pat. No. 3,960,817 describes an SSP reaction at pressures of less than 1 torr (i.e. less than 1.33 mbar). Analogously, in WO 2004/106025, an SSP reaction is carried out at pressures of below 1 mbar. A common aspect of these processes of the prior art is that a complicated and expensive vacuum technology is necessary to achieve and maintain the low pressures required in the reaction space. Since only very small amounts of inert gas can flow through the reaction space because of the low pressures to be set, condensation of the by-products and corrosion and blockage problems resulting therefrom can occur in the vacuum pump.

It was an object of the present invention to overcome the above-described problems of the prior art.

According to the present invention, it has surprisingly been found that the known SSP reaction of polyesters can be operated efficiently and more cheaply when a combination of moderate reduced pressure and low flow of inert gas through the reaction space is employed.

The present invention thus provides a process for the solid-state polycondensation of polyesters, preferably polyethylene terephthalate or copolymers thereof, characterized in that the solid-state polycondensation is carried out using polyester prepolymer particles in a reaction space in which an absolute pressure in the range from 10 mbar to 200 mbar, preferably from 20 to 150 mbar, and a process gas flow in the R value range from 0.005 to 0.05 is set.

The R value is defined as the ratio of hourly amount of process gas (in kg) flowing through the reaction space to hourly amount of polymer (in kg) flowing through the reaction space:

$$R = \frac{m(\text{gas})/h}{m(\text{polymer})/h}$$

In the prior art, R values of at least 0.1 have hitherto been considered necessary for carrying out an SSP reaction under conventional, generalized conditions in order to remove the by-products formed in the SSP reaction efficiently and shift the reaction equilibrium to the product side (i.e. in the direction of polymers having a higher molecular weight). As indicated above, it is necessary here always to circulate such large amounts of inert gas through the reaction space that loss of these is economically unacceptable. Accordingly, complicated gas purification steps have to be provided and carried out.

In contrast, the process of the invention can be carried out at significantly lower R values and thus with significantly smaller amounts of gas. The reduced removal of by-products from the reaction space by the inert gas due to the reduced amount of gas is compensated by the simultaneous application of a moderately reduced pressure. It has been found that satisfactory removal of by-products is obtained even when, in addition to the above-described gas stream through the reaction space at an R value in the range from 0.005 to 0.05, such a reduced pressure is applied to the reaction space that an absolute pressure in the range from 10 mbar to 200 mbar, preferably from 20 to 150 mbar, is set in the reaction space.

Owing to the fact that a less reduced pressure than that hitherto described in the prior art has to be applied to the SSP apparatus, the outlay in terms of apparatus for generating and maintaining the reduced pressure or vacuum is reduced.

In the process of the invention, a sufficiently large amount of process gas is conveyed through the reaction space that the risk of condensation of by-products from the waste gas due to supersaturation is considerably reduced or is no longer present.

In a particularly preferred embodiment of the present invention, the process is carried out under conditions of gas flow through the reaction space and a reduced pressure in the process space so that an S value of at least 0.3/bar, preferably at least 0.8/bar results. The S value is defined as follows:

$$S = \frac{R}{\text{absolute pressure(bar)}} = \frac{m(\text{gas})/h}{m(\text{polymer})/h \cdot \text{absolute pressure(bar)}}$$

The present invention is described in detail below with reference to non-limiting figures and examples.

Figure 1:
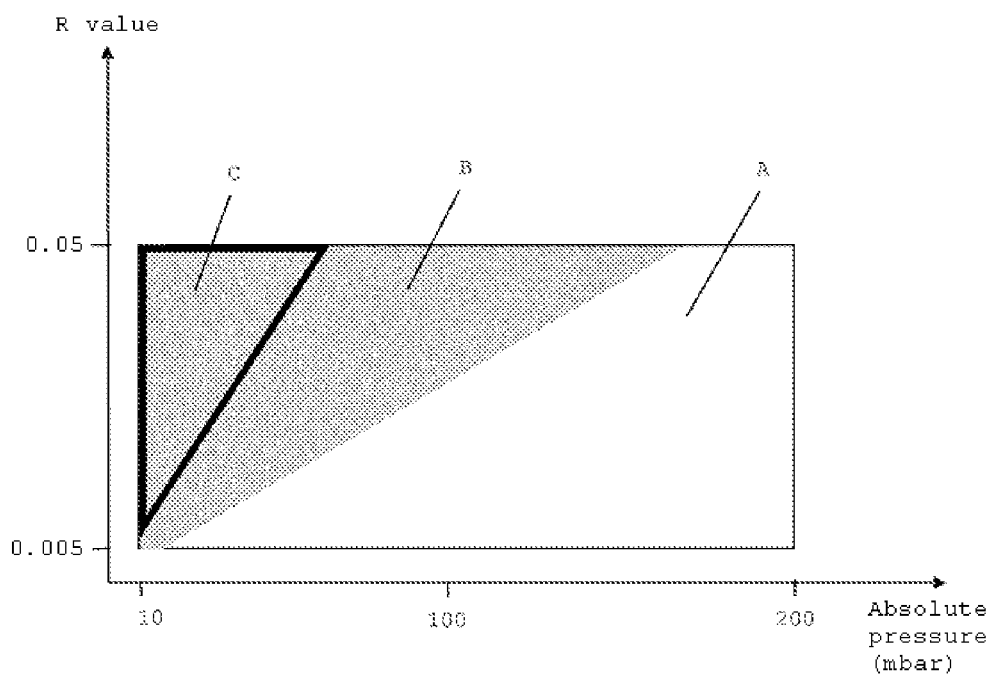
FIG. 1 is a graphical presentation of the relationship between R value and absolute pressure in the SSP reaction according to the invention.

FIG. 1 shows the process regions which can be used according to the invention in graph form. The rectangular region describes the process window A having an R value of from 0.005 to 0.05 and an absolute pressure of from 10 mbar to 200 mbar in which the process of the invention can be carried out. This window contains the preferred region B which is denoted by the gray triangle and in which the S value is at least 0.3/bar (defined by an R value of 0.005 at an absolute pressure of 16.7 mbar and an R value of 0.05 at an absolute pressure of 166.7 mbar). Within this gray triangle, there is the region C which is particularly preferred according to the invention and in which the S value is at least 0.8/bar (defined by an R value of 0.008 at an absolute pressure of 10 mbar and an R value of 0.05 at an absolute pressure of 62.5 mbar).

The process of the invention is employed for preparing a polyester, with the preparation of polyethylene terephthalate or a copolymer thereof being particularly preferred.

Polyesters are crystallizable, thermoplastic poly-condensates, for example polyethylene terephthalate (PET), polybutylene terephthalate (PBT), polytrimethyl terephthalate (PTT), polyethylene naphthalate (PEN), polytrimethyl naphthalate (PTN), polyhydroxyalkanoates or polylactides, which are present either as homopolymer or as copolymers. Polyesters are obtained by polycondensation of their monomers, usually a diol component (e.g. linear or cyclic diol components having from 2 to 10 carbon atoms) and a dicarboxylic acid component (e.g. aromatic dicarboxylic acid components usually having from 1 to 3 aromatic rings). Instead of the dicarboxylic acid, it is also possible to use its corresponding diesters, in particular dimethyl ester. Instead of diol and dicarboxylic acid components, it is also possible to use components having at least one carboxylic acid group and an alcohol group (e.g. compounds of the formula

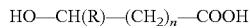

HO—CH(R)—(CH$_2$)$_n$—COOH where R is usually an aliphatic hydrocarbon having from 1 to 15 carbon atoms and n=0 to 10, usually from 0 to 3) as monomers.

Elimination of a low molecular weight reaction product occurs in the polycondensation reaction. The polycondensation can occur directly between the monomers or via an intermediate which is subsequently converted by transesterification, wherein the transesterification may again proceed via elimination of a low molecular weight reaction product or by ring-opening polymerization. The polyester obtained in this way is essentially linear, with a small number of branches being able to be formed. The polyester can be a new material or a recycled material.

Additives can be added to the polyester. Suitable additives are, for example, catalysts, dyes and pigments, UV blockers, processing auxiliaries, stabilizers, impact modifiers, chemical and physical blowing agents, fillers, nucleating agents, flame retardants, plasticizers, particles which improve barrier properties or mechanical properties, reinforcing bodies such as spheres or fibers and also reactive substances, for example oxygen absorbers, acetaldehyde absorbers or substances which increase the molecular weight, etc.

Catalysts used are metallic elements, for example antimony, germanium, aluminum or titanium or else manganese, cobalt, zinc, tin or calcium. The content of the metallic elements in the polyester is usually in the range from 5 to 400 ppm, with an antimony content in the range from 20 to 300 ppm, a germanium content in the range from 10 to 150 ppm, an aluminum, manganese, cobalt, zinc, tin or calcium content in the range from 10 to 200 ppm or a titanium content in the range from 5 to 20 ppm being preferred.

A polyester which is frequently used for, in particular, producing hollow bodies, for example bottles, is polyethylene terephthalate (PET). Polyethylene terephthalate is obtained from its monomers, viz. a diol component and a dicarboxylic acid component, by polycondensation with elimination of low molecular weight reaction products. Here, the diol components consist mainly, in particular to an extent of more than 90 mol %, of ethylene glycol (1,2-ethanediol) and the dicarboxylic acid components consist mainly, in particular to an extent of more than 90 mol %, of terephthalic acid, with the total comonomer content usually being in the range from 1 to 15 mol %, in particular from 2 to 10 mol %. Instead of the terephthalic acid, it is also possible to use its corresponding diester, in particular dimethyl ester. The comonomer content corresponds to the sum of the diol comonomer content and the dicarboxylic acid comonomer content. The diol comonomer content is determined as number of moles of the diol comonomers based on the total number of moles of the diols. The dicarboxylic acid comonomer content is determined as number of moles of the dicarboxylic acid comonomers based on the total number of moles of the dicarboxylic acids. Possible comonomers are further linear, cyclic or aromatic diol and dicarboxylic acid compounds. Typical comonomers are diethylene glycol (DEG), isophthalic acid (IPA) or 1,4-bishydroxymethylcyclo-hexane (CHDM). Low molecular weight reaction products formed are, for example, water, ethylene glycol, acetaldehyde, methanol and further optional diols.

To produce polyester prepolymer particles, a polyester prepolymer melt is firstly produced which is subsequently cooled and shaped to form particles. The polyester prepolymer melt is produced by polycondensation of the monomers in the liquid phase (molten-state polycondensation). The polycondensate melt is usually produced in a continuous process. Here, firstly a stage for mixing of monomers (paste production), an esterification stage and then a prepolycondensation stage under reduced pressure usually take place. In the conventional polyester preparation process, a polycondensation stage in a high-viscosity reactor (also referred to as finisher) likewise takes place under reduced pressure. This results in the formation of a prepolymer having an intrinsic viscosity of typically from 0.35 dl/g to 0.8 dl/g, in particular above 0.5 dl/g and below 0.75 dl/g. The preparation of the polyester can also be carried out in a batch process. All this is commonly known (cf. e.g. Scheirs/Long (editors), Modern Polyesters, Wiley 2003, chapter 2.4.1).

As an alternative, the abovementioned polycondensation stage in the high-viscosity reactor can be omitted. This results in the formation of a low-viscosity polyester prepolymer having an intrinsic viscosity of typically from 0.2 dl/g to 0.5 dl/g, in particular above 0.3 dl/g and below 0.45 dl/g.

The production of the polyester prepolymer melt is, as an alternative, also carried out by melting of polyesters as raw material. This can, for example, be carried out by means of a continuous kneader or extruder or else in a polymerization reactor. The polyesters are in this case present in solid form, for example as pellets, powder or chips. It is usually advantageous to dry polyesters before melting. After melting, a further polycondensation step can optionally be carried out. Likewise, an already higher-viscosity polyester can also be brought to a lower viscosity level by melting and depolymerization. The polyester prepolymer melt can also be produced from a mixture of freshly polymerized polyester and melted polyester, wherein the melted polyester can be added to the freshly polymerized polyester at the end of the polymerization section or in an intermediate step. Particularly when recycled polyesters are melted, it is advantageous to test the melt by in-line or on-line measurement of quality features, for example viscosity or color, before it is combined with freshly polymerized melt in order to divert optional low-quality products, for example, to a separate pelletization apparatus, and thereby prevent contamination of fresh material. The in-line measurement is carried out directly in the melted prepolymer. The on-line measurement can be carried out in a side stream of the melt or on a test specimen, strand, band, pellets or the like produced therefrom.

The polyester prepolymer melt is usually subjected to a filtration in order to eliminate solid impurities; depending on the viscosity, sieves having mesh openings in the range from 5 to 150 μm are used here.

According to the invention, a polyester prepolymer melt having an intrinsic viscosity of from 0.35 to 0.80 dl/g, preferably above 0.45 dl/g, in particular above 0.5 dl/g, and preferably below 0.75 dl/g, in particular below 0.70 dl/g, is produced. The intrinsic viscosity (IV) indicates the solution viscosity and is determined by the following method:

The solution viscosity is measured using a mixture of phenol/dichlorobenzene (50:50% by weight) as solvent. The polyester sample is dissolved in a concentration of 0.5% (0.5 g/dl) over a period of 10 minutes at 130° C. The measurement of the relative viscosity (R.V.) is carried out at 25° C. using an Ubbelohde viscometer (in accordance with DIN procedure No. 53728, Part 3, January 1985).

The relative viscosity is the ratio of the viscosity of the solution and the viscosity of the pure solvent, which is comparable to the ratio of the corresponding capillary flow rate. Using the equation of Huggins, the value of the intrinsic viscosity is calculated from the measured relative viscosity:

$$I.V. = \frac{\sqrt{1+4K_H(R.V.-1)} - 1}{2*c*K_H}$$

Using the above measurement methods (polymer concentration C=0.5·g/dl and the Huggins constant $K_H$=0.35), the following equation is obtained:

$$I.V. = \frac{\sqrt{1+1.4(R.V.-1)} - 1}{0.35} (dl/g)$$

The viscosity of the polyester can be reported either as intrinsic viscosity (IV) or as average molecular weight (number average Mn). To convert an IV value measured in phenol:dichloromethane=1:1 into the average molecular weight, use is made of the equation $$IV = k * Mn^a$$

where $k=2.1\times10^{-4}$ and a=0.82.

This equation can be applied generally to published data when a different solvent mixture and the conversion factors for this are not indicated explicitly.

The end group concentration (EGN) can be calculated from the average molecular weight using the equation:

$$EGN = \frac{2 \cdot 10^6}{Mn}$$

where Mn is in g/mol and an EGN in mol/t results.

The content of the individual end groups can be calculated by means of the carboxyl end group concentration ($c_{COOH}$) and the end group concentration, with only the presence of hydroxyl and carboxyl end groups being taken into account in the interests of simplicity, so that $EGN=c_{COOH}+c_{OH}$.

carboxyl end group content $X_{COOH}=c_{COOH}/EGN$;

hydroxyl end group content $X_{OH}=c_{OH}/EGN=(1-X_{COOH})$

Here, $c_{COOH}$ is the concentration of carboxyl end groups in mol/t and $c_{OH}$ is the concentration of hydroxyl end groups in mol/t.

In a preferred embodiment of the present invention, the amounts of the diol components and of the dicarboxylic acid components and also the conditions in the prepolyester production process are selected so that a prepolyester having a carboxyl end group content of from 0.25 to 0.6 is formed, with the carboxyl end group content preferably being above 0.30, in particular above 0.35, and preferably below 0.55, in particular below 0.5.

The particles can be shaped in various ways from the polyester prepolymer melt. It is possible to employ comminution of lumps, strands or strips shaped from the polymer melt, or direct shaping of particles, for example by breaking up into droplets or atomization. The cooling and shaping of the polyester prepolymer melt is usually carried out by pelletization. In pelletization, the polyester prepolymer melt is, for example, pressed through a die having an opening (hole) or a plurality of openings and cut or broken up into droplets. The die openings are usually round but can also have a different profile, e.g. slit-like openings. It should be ensured that the product mass flow per die hole should be kept within a narrow range over time and in space; the standard deviation of the individual product mass flows should be kept in the range from 0.1 to 10%. To achieve this, depending on the position of a die hole, the diameter or length thereof can be varied. At the same time, very uniform inflow conditions (pressure, velocity, temperature, viscosity, etc.) to the individual die holes should be ensured. Cutting can be carried out either directly at the exit from the die or only after passing through a treatment section.

The polyester prepolymer melt is solidified by cooling. This can be effected with the aid of a liquid cooling medium (e.g. water, ethylene glycol) or a gaseous cooling medium (e.g. air, nitrogen, steam) or by contact with a cold surface, with combinations of the cooling media also being conceivable. Cooling can take place either simultaneously, for example before or after shaping to form particles. If a liquid cooling medium is used, this has to be separated off, which is carried out partly by means of simple separators, e.g. sieves or gratings, and possibly additionally by means of centrifugal force, for example in a centrifugal dryer, by impingement, for example in an impingement dryer, and/or by means of a stream of gas.

Known pelletization processes are, for example, rotoforming, strand pelletization, water ring pelletization, underwater pelletization or hot-face pelletization, and also breaking up into droplets or atomization. Such processes are described, for example, in WO 00/23497, WO 01/05566, WO05/087838, WO 03/054063 or WO 96/22179.

The average pellet size should be in the range from 0.1 mm to 10 mm, preferably from 0.5 mm to 3 mm and in particular from 0.85 to 2.5 mm. The average pellet size is the statistical average of the average pellet diameter, which is obtained from the average of pellet height, length and width. The pellet size distribution should be kept in a narrow range. The standard deviation of the pellet weights of 100 measured pellets is preferably in the range from 2 to 20%. The pellets can have a defined pellet shape, for example cylindrical, spherical, droplet-shaped, sphere-like or a design shape as is proposed, for example, in EP0541674B1. Solid pellets or porous pellets obtained, for example, by foaming, sintering and the like can be used.

Cooling can be carried out to a temperature which is below the glass transition temperature of the polyester, which allows storage and/or transport of the pellets over a longer period of time. The average temperature of the prepolyester pellets can, however, also be kept at a relatively high level in order to improve the energy efficiency of the subsequent processes. For this purpose, it is possible to increase the temperature of the cooling medium and/or make the residence time in the cooling medium correspondingly short.

Although a partial crystallization can be carried out during the production of the polyester prepolymer particles, a crystallization step is usually necessary to obtain partially crystalline polyester prepolymer particles. Crystallization can take place independently or coupled with particle production. A number of apparatuses for producing particles can be combined with a crystallization apparatus. Crystallization can take place in one step or in a plurality of steps and thus in one apparatus or in a plurality of apparatuses connected in series. Crystallization can be carried out continuously or batchwise. Crystallization can optionally be carried out in two or more apparatuses operated in parallel.

Crystallization is carried out by the methods known in the prior art, for example by thermal crystallization, by solvent-induced crystallization or by crystallization brought about by mechanical stretching. Crystallization is preferably carried out by a thermal route, forming a thermally partially crystallized polycondensate. Crystallization should be carried out at a suitable temperature over a suitable residence time. A degree of crystallization which at least allows further thermal treatment, for example drying or a solid-state polycondensation, without agglomeration or lump formation occurring in this treatment should be achieved in the crystallization.

The suitable temperature range can be seen when the crystallization half-value time ($t_{1/2}$) measured by DSC is plotted as a function of temperature. It is limited above and below by the temperature at which the crystallization half-value time reaches about 10 times the minimum crystallization half-value time $t_{1/2min}$. Since very short crystallization half-value times (t) can be determined only with difficulty, $t_{1/2min}=1$ minute is used as minimum value. The suitable crystallization time is given by the time for heating the product to the crystallization temperature plus at least the crystallization half-value time at the given temperature, with 2-20 half-value times preferably being allowed for the heating time in order to achieve a sufficient degree of crystallization.

To prevent agglomeration of the crystallizing prepolymer particles, they should be kept in motion relative to one another. Suitable crystallization reactors are vibrating reactors, rotating reactors, reactors having agitators and reactors through which a process gas can be passed, in which case the flow velocity of the process gas has to be sufficient to move the prepolymer particles. Preference is given to flow velocities in the range of 1-6 m/s, in particular greater than 1.5 m/s and less than 4 m/s. The gas velocity corresponds to the velocity of the gas in the empty cylinder, i.e. the amount of gas per unit time divided by the cross section of the treatment space. Particularly suitable crystallization reactors are moving-bed or fluidized-bed crystallizers since these do not tend to form dust.

In the case of polyethylene terephthalate, the suitable temperature range is from 100 to 220° C., and a degree of crystallization of at least 25%, preferably at least 30%, is achieved in from 5 to 20 minutes.

Crystallization can be carried out from the glass state, i.e. after temporary cooling to a temperature below the crystallization temperature, in particular below the glass transition temperature Tg. Processes in which crystallization is carried out at least partly from the melt are also suitable, in which case an increase in the crystallinity occurs during the cooling phase and/or a hold phase at elevated temperature. If the temperature of the polyester prepolymer particles is below the suitable crystallization temperature when the particles enter the crystallization process, the polyester prepolymer particles have to be heated. This can be effected, for example, via a heated wall of the crystallization reactor, via heated internals in the crystallization reactor, by means of radiation or by blowing-in a hot process gas.

Simultaneously with the increase of the degree of crystallization, optional residues of the liquid arising from the pelletization process are also removed. If a circulated process gas is used in the crystallization process, sufficient fresh gas or purified process gas has to be added thereto in order to prevent excessive accumulation of liquid or other substances which diffuse out in the circulated process gas. As process gases, it is possible to use, for example, air, steam or inert gases such as nitrogen, $CO_2$ or mixtures thereof. The process gases can contain additives which either react with the product to be treated or deposit passively on the product to be treated.

Further apparatuses such as heat exchangers, separation apparatuses such as filters or cyclones, gas transport apparatuses such as blowers, compressors or fans, gas purification systems such as gas scrubbers, combustion systems or adsorption systems, or fittings such as flaps, valves or branches, can be integrated into the process gas circuit.

The polyester prepolymer particles can optionally be subjected to a treatment to reduce their tendency to agglomerate before crystallization, as is described in PCT/CH2008/000389.

The polyester prepolymer particles can optionally be heated before the crystallization. This can be carried out in a preheating stage, wherein the supply of heat can originate from a later cooling step, as is described in EP 01789469 B1. As an alternative, the heat can also be generated directly for the preheating stage or be effected by heat recovery from a heat source in a preceding process of molten-state polymerization. In the production of polyethylene terephthalate, it is possible, for example, to use the vapor from the column for separation of water and ethylene glycol as heat source for the preheating stage.

Particularly suitable apparatuses for crystallization are fluidized-bed apparatuses as are described, for example, in EP-1 425 146 A2. Heating to crystallization temperature and the subsequent crystallization can be carried out in one or more crystallization apparatuses. The size of the apparatuses required is indicated by the sum of all areas of the sieve plates of the apparatuses, with sieve plate areas of from 10 to 100 m$^2$ being required for treatment of from 40 to 100 t/h. Sieve plate areas of from 20 to 60 m$^2$ are necessary in the crystallization of cold PET pellets.

After the crystallization, a step for heating the partially crystalline polyester prepolymer particles to a suitable reaction temperature may be necessary in order to obtain heated polyester prepolymer particles. Heating can take place independently or coupled with the crystallization. A plurality of apparatuses for crystallization can be combined with one apparatus for heating. Heating can take place in one step or in a plurality of steps and thus in one apparatus or in a plurality of apparatuses connected in series. Heating can be carried out continuously or batchwise. Heating can optionally be carried out in two or more apparatuses operated in parallel. Suitable apparatuses for heating are rotating reactors, reactors having agitators and also reactors through which a process gas flows.

After heating, the SSP reaction according to the invention is carried out in order to obtain polyester particles having an intrinsic viscosity in the range from 0.70 to 0.95 dl/g, in particular above 0.75 dl/g. The increase in the intrinsic viscosity should be at least 0.05 dl/g, in particular at least 0.1 dl/g.

The SSP reaction of the heated polyester prepolymer particles is preferably carried out in a suitable, essentially vertical reactor. According to the invention, the heated polyester prepolymer particles are introduced into the upper part of the reactor, as a result of which the polyester particles flow through the reactor from the top downward under the action of gravity. The polyester particles flow through the reactor as a fixed bed, referred to as a moving fixed bed. A very narrow residence time range of the individual particles is sought here. Fluidization or other active mixing of the particles should be avoided.

The SSP reaction is carried out in a temperature range from 180° C. to 5° below the crystalline melting point of the polyester particles, preferably from 5° to 80° C. below the crystalline melting point of the polyester particles, with temperatures which are less than 60° C. and/or more than 20° C. below the crystalline melting point of the polycondensate particles being preferred. Due to the reaction and ongoing crystallization during the reaction, the temperature of the polyester particles can rise by from 1 to 20° C., and the maximum temperature arising therefrom should also be in the range of the suitable reaction temperature. In the case of polyethylene terephthalate, the suitable SSP reaction temperature is in a temperature range from 190° C. to 240° C., with temperatures below 225° C., in particular below 220° C., being preferred.

The suitable reaction time is from 2 to 30 hours, with, for economic reasons, residence times of less than 24 hours, in particular less than 20 hours, and of more than 6 hours, preferably more than 8 hours, being preferred.

The present invention further provides an apparatus for carrying out the above-described process for solid-state polycondensation of polyesters, preferably polyethylene terephthalate or copolymers thereof, which comprises a reactor having a materials inlet in its lid region and a materials outlet in the bottom region, optionally a process gas feed line in the bottom region of the reactor, and a vacuum system connected to the lid region of the reactor, reservoirs upstream of the materials inlet and downstream of the materials outlet of the reactor, with the reservoir arranged upstream or downstream of the materials outlet of the reactor having a process gas feed line when the process gas feed line is not present on the reactor, and shutoff devices between the reservoirs and the materials inlet and the materials outlet of the reactor and also upstream and downstream of the reservoirs.

The SSP reaction according to the invention takes place in a reaction space which is connected to at least one vacuum system and to a gas feed line. According to the invention, the vacuum system is preferably a one- or two-stage vacuum unit. According to the invention, conventional vacuum systems such as vacuum pumps can be used; it is an advantage of the present invention that no high-performance vacuum systems have to be used since absolute pressures of only from 10 to 200 mbar have to be achieved in the reaction space.

The reaction space can, as described above, be a vertical reactor or alternatively a rotating horizontal reactor. Such horizontal reactors are known, e.g. from DE 102 25 075 A1.

The reactor can merely be insulated (when the polyester prepolymer has already been brought to the required reaction temperature before it is introduced into the reactor). Feed lines for the polyester particles can be integrated into the reactor or at least into the insulation around the reactor, by which means heat losses from the transport line can be reduced. As an alternative, the reactor can be heatable. Heating of the reactor can be effected via its reactor wall, via heated internals in the reactor or by means of electromagnetic waves (microwave or IR radiators) in the interior of the reactor.

The process gas is usually fed in at the lower end of the reactor and taken off at the upper end of the reactor, resulting in a process gas stream in countercurrent to the flow of the polyester particles. Conversely, a cocurrent from the upper end of the reactor to the lower end of the reactor is also conceivable. In the case of a horizontal reactor, the process gas is usually introduced at one end and taken off at the other end, with the introduction being able to be carried out in the flow direction of the product stream (cocurrent) or in the opposite direction (countercurrent). As an alternative, the introduction can also be effected via a plurality of introduction points in the wall of the reactor, as a result of which a cross-current is essentially formed.

The reactor can have internals, for example to equalize the flow conditions, or serve as gas inlet or to reduce the product pressure. Such reactors are described, for example, in the documents EP1337321B1, U.S. Pat. No. 6,010,667 and DE102007031653A1, which are incorporated by reference into the present invention.

The product flow of the polyester prepolymer particles into and out of the reactor is regulated by shutoff devices such as star feeders, screws, slide valves, discharge devices from the reaction space, cycled shutoff devices such as double slide valve locks and/or transport devices or combinations of the above devices.

According to the invention the transport of product away from the reactor is preferably effected by a star feeder followed by a shutoff slide valve. This gives a uniform product flow. Closing of the slide valve in the product stream is prevented.

In an embodiment of the invention, cycled shutoff devices having one or more buffer vessels (preliminary feed vessels) located in between are used for introduction of product. Here, the buffer vessels are preferably connected to a vacuum system. The vacuum system can in this case be a separate system or be the vacuum system to which the reaction space is connected. When a separate vacuum system is used, this can simultaneously be used for conveying product into a buffer vessel above the reaction space.

The process gas can be introduced either directly into the reaction space or indirectly downstream of a shutoff device. According to the invention, nitrogen is preferably used as process gas.

In a preferred embodiment of the present invention, at least one cold trap is arranged between the reaction space or the buffer vessel or vessels and the vacuum system, preferably a vacuum pump. The cold trap can be a plate heat exchanger, a shell-and-tube heat exchanger, a vessel with jacket cooling or cooling coils. Such cold traps are known to those skilled in the art. Very particular preference is given to at least two cold traps being arranged in parallel here. This makes it possible to empty and clean one of the cold traps while the other cold trap is in operation.

According to a further embodiment of the present invention, one or more filters can be arranged between reaction space and vacuum system.

The above measures prevent possible condensation of by-products in the vacuum system and damage to the system (corrosion, blocking) caused thereby. However, this risk is in any case considerably reduced by the process conditions according to the invention, so that the above measures are not absolutely necessary.

In a further preferred embodiment of the present invention, the cold trap has a flow-through channel for the process gas and also a flow-through channel for the cooling medium. As cooling medium, preference is given to using liquid vaporizing nitrogen. Here, particular preference is given to feeding the vaporizing nitrogen from the cold trap into the reaction space.

The SSP reaction is carried out under the above-described conditions of absolute pressure and gas flow (defined by the R value) shown in FIG. 1.

Figure 2:
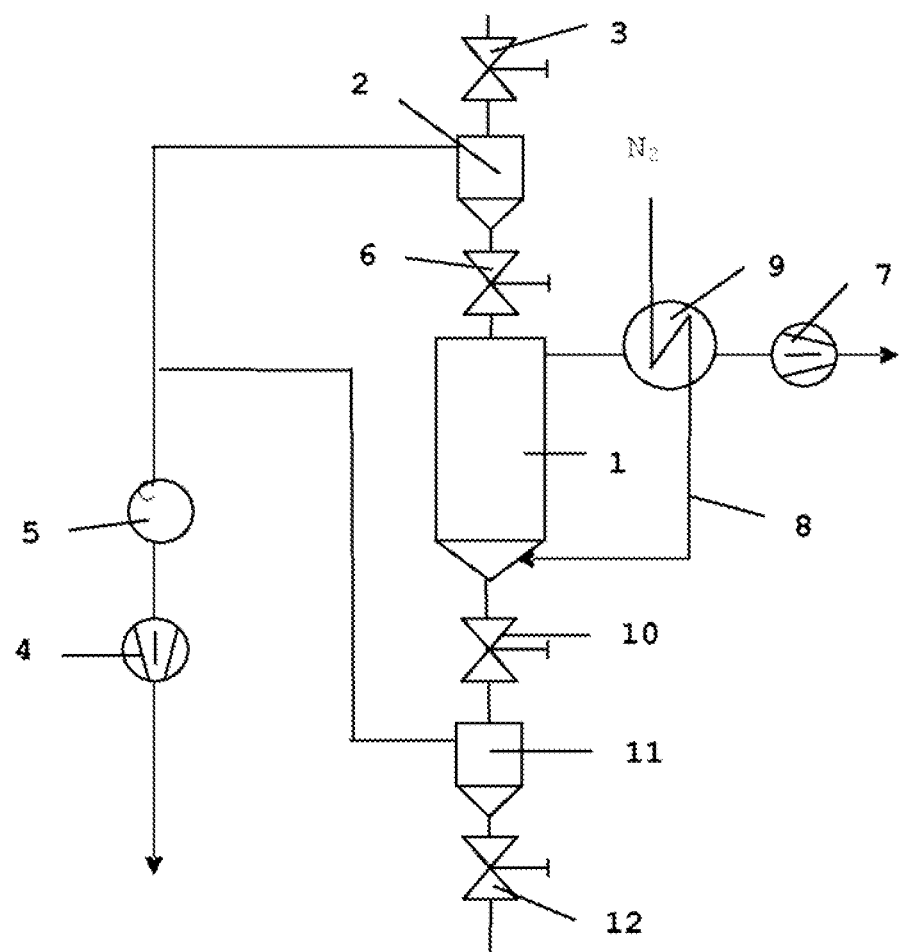
FIG. 2 is a first embodiment of an apparatus according to the invention.

FIG. 2 shows a first embodiment of an apparatus according to the invention. A vertical reactor 1 contains the reaction space in which the SSP reaction is carried out under the conditions according to the invention. The material to be treated enters a reservoir (buffer vessel) 2 via a cycled valve 3. In the embodiment shown here, the vacuum conditions according to the invention, as also are set in the reactor 1 while carrying out the SSP reaction and are described above, are preferably applied to the reservoir 2. In an alternative embodiment of the present invention, the vacuum level in the reservoir 2 can also deviate from the vacuum level in the reactor 1, in particular be higher. When the valve 3 is opened in order to allow material to enter the reservoir 2, the pressure level in the reservoir 2 corresponds approximately to the pressure level upstream of the valve 3. After the introduction of material is complete, the valve 3 is closed and the pressure in the reservoir 2 is set appropriately. After opening of the valve 6 to allow material into the reactor 1, the pressure levels in the reactor 1 and the reservoir 2 are equalized. After the introduction of material into the reactor 1 is complete, the valve 6 is closed again for the next cycle.

For this purpose, the reservoir 2 is connected to a vacuum pump 4 in this embodiment. As indicated above, it is also possible to connect the reservoir 2 to the vacuum system which provides the reduced pressure conditions in the reactor 1. A cold trap 5 is arranged upstream of the vacuum pump 4 in order to protect the vacuum pump 4 against any materials which condense out. A storage volume (air chamber) can optionally be arranged upstream of the vacuum pump (5) for pressure equalization.

The material to be treated is introduced from the reservoir 2 into the reactor 1 via a cycled valve 6. The reactor 1 is connected in its upper region (lid region) to a vacuum pump 7. In the embodiment shown here, the vacuum pump 7 is a vacuum system different from vacuum pump 4 for the buffer vessels. A storage volume (air chamber) can optionally be arranged upstream of the vacuum pump (7) for pressure equalization.

The lower region (bottom region) of the reactor 1 is connected to a feed line 8 for nitrogen as process gas. The nitrogen is thus conveyed through the reactor 1 in countercurrent to the stream of material and drawn off again from the upper region of the reactor 1 by the vacuum pump 7.

In this embodiment, the nitrogen to be introduced into the reactor 1 serves primarily as cooling medium in the cold trap 9 in order to condense out any materials which are harmful to the vacuum pump 7. The nitrogen is in this case conveyed through cooling coils of the cold trap 9 before it goes via the line 8 into the reactor 1. This gives very efficient utilization of the process gas employed.

After flowing through the reactor 1, the material is conveyed via a cycled valve 10 into a reservoir (buffer vessel) 11 from where it leaves the apparatus via the cycled valve 12. In the embodiment shown here, the reduced pressure conditions according to the invention, as also are set in the reactor 1 while carrying out the SSP reaction and are described above, are likewise applied to the reservoir 11. In an alternative embodiment of the present invention, the vacuum level in the reservoir 11 can also deviate from the vacuum level in the reactor 1, in particular be above it. When the valve 10 is opened in order to allow material to enter the reservoir 11, equalization of the pressure levels in the reactor 1 and the reservoir 11 occurs. After the introduction of material into the reservoir 11 is complete, the valve 10 is closed and the valve 12 is opened. When the valve 12 is opened in order to discharge material from the reservoir 10, the pressure level in the reservoir 11 corresponds approximately to the pressure level downstream of the valve 12. The valve 12 is subsequently closed for the next cycle, and the pressure in the reservoir 11 is set appropriately.

In this embodiment for this purpose the reservoir 11 is connected to the vacuum pump 4 which is likewise connected to the reservoir 2. As indicated above, it is also possible to connect the reservoir 11 to the vacuum system which provides the reduced pressure conditions in the reactor 1.

Figure 3:
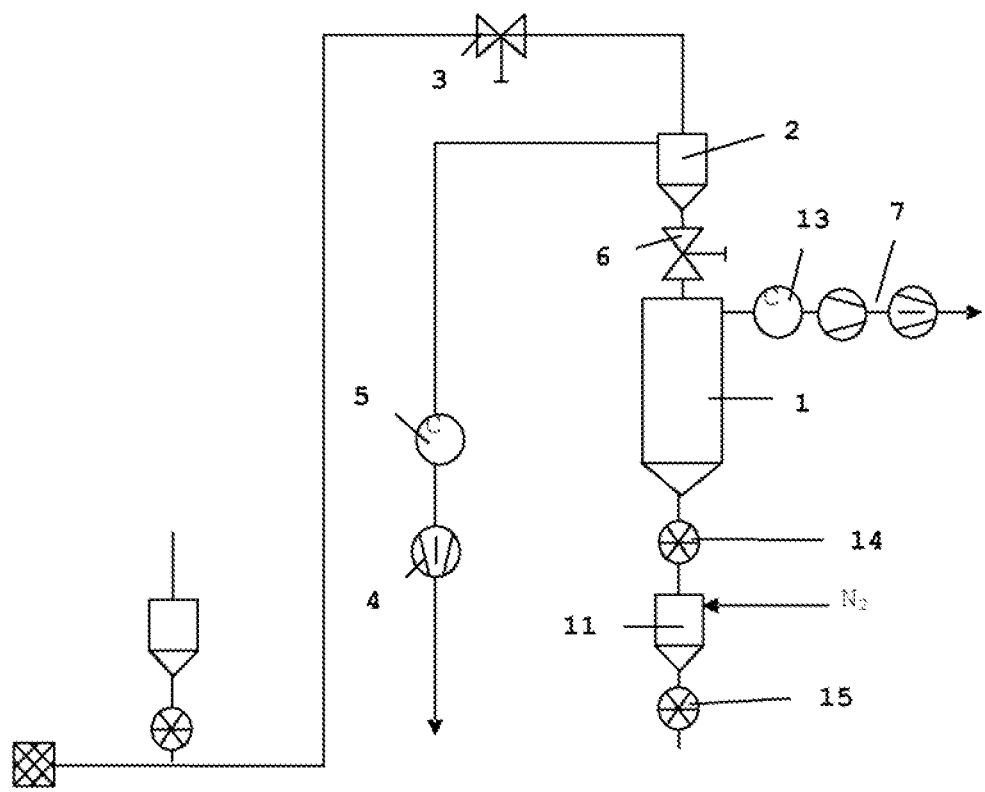
FIG. 3 is a second embodiment of an apparatus according to the invention.

FIG. 3 shows a further embodiment of an apparatus which can be used according to the invention. In FIGS. 2 and 3, identical components are denoted by the same reference numerals. The embodiment shown in FIG. 3 differs from the apparatus shown in FIG. 2 in that the vacuum pump 4 simultaneously serves as transport pump for introducing the material into the reservoir 2. Furthermore, the process gas (nitrogen) is not fed directly into the reactor 1 but instead into the reservoir (buffer vessel) 11. Reduced pressure conditions therefore are not set in the reservoir (buffer vessel) 11; the latter is, in the present embodiment, not connected to the vacuum pump 4. The process gas fed in is also not introduced primarily via a cold trap. The vacuum pump 7 (in this embodiment a double station vacuum pump) is in this embodiment separated from the reactor 1 by a conventional cold trap element 13. A storage volume (air chamber) can optionally be arranged upstream of the vacuum pump (5 and/or 7) for pressure equalization.

In the embodiment shown here, no cycled valves are arranged between the reactor 1 and the reservoir 11 and downstream of the reservoir, but continuous valves (e.g. star feeders) 14 and 15 are instead installed here. In order to prevent intake of air into the reactor 1, process gas has to be introduced into the reservoir 11 in such an amount that no air can get into the reactor 1 via the valves 14 and 15. The shutoff effect of the valves 14 and 15 should in this case be set so that a very large amount of nitrogen flows through valve 14 into the reaction space 1 and very little nitrogen flows through valve 15 to the outside. In a preferred embodiment according to the invention, the pressure in the reservoir 11 is above ambient pressure.

Figure 4:
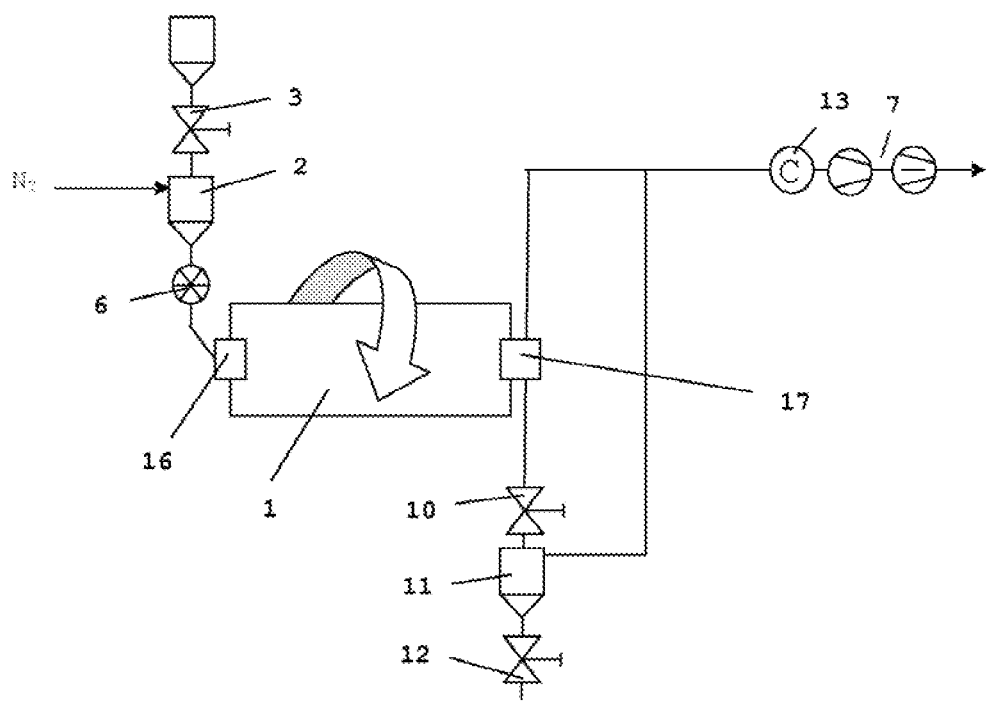
FIG. 4 shows a further embodiment of an apparatus which can be used according to the invention.

FIG. 4 shows a further embodiment of an apparatus which can be used according to the invention. In FIGS. 2 to 4, identical components are denoted by the same reference numerals. The embodiment shown in FIG. 4 differs from the apparatus shown in FIG. 2 in that a horizontal reactor 1 having a lateral materials inlet 16 and a lateral materials outlet 17 is provided instead of a vertical reactor. The horizontal reactor 1 is configured as a rotary oven which rotates about its longitudinal axis in the direction of the arrow shown in FIG. 4. A continuous valve (star feeder) 6 is arranged between the reservoir 2 and the reactor 1. Not only the reservoir 11 provided with valves 10 and 12 but also a vacuum pump 7 (here a double station vacuum pump) are connected to the materials outlet 17 and are separated from the materials outlet 17 by a conventional cold trap system 13. The reservoir 11 is likewise connected to the vacuum pump 7 via the cold trap element 13. The process gas (in this case nitrogen) is fed in via the reservoir 2. In a preferred embodiment of the invention, the pressure in the reservoir 2 is above ambient pressure when the shutoff device 3 is open.

After the SSP reaction, a step for cooling the polyester polymer particles can be carried out. The polyester polymer particles can be cooled to a temperature suitable for storage and transport or to a temperature for direct further processing. Cooling is effected by methods known in the prior art, for example in plate heat exchangers, in fluidized-bed coolers, in transport units using an excess of cooling medium, by direct introduction into a cooling liquid, by contact with a cold surface or by a combination of various cooling methods. Part of the cooling can already be carried out in the reactor by introduction of a cold gas stream. Preferred cooling apparatuses are fluidized-bed coolers or cooling reactors through which a gas stream is conveyed in countercurrent.

The polyester polymer particles can be processed to produce various products, for example fibers, tapes, films or injection-molded parts. Polyethylene terephthalate is, in particular, processed to produce hollow bodies such as bottles.

The present invention is explained further with the aid of nonlimiting examples. Unless defined otherwise, the unit "standard l/h" is the amount of gas which flows through a cross section every hour under standard conditions (0° C., 101.325 kPa).

EXAMPLE 1

2.2 kg of precrystallized pellets of polyethylene terephthalate having a comonomer content of 2% of IPA (isophthalic acid) and about 1.5% of DEG (diethylene glycol) and an initial intrinsic viscosity (IV) of 0.6 dl/g were treated in a laboratory reactor having a diameter of 10 cm. The treatment comprised preheating, transition operation and post-condensation (SSP). Preheating was carried out at ambient pressure in a hot stream of nitrogen over a period of one hour until the PET pellets had reached a temperature of 205° C. During transition operation, the amount of gas was reduced stepwise over a period of 30 minutes to 10 standard l/h. After transition operation, 20 g of product sample were taken from the uppermost layer.

Post-condensation was carried out by rapidly lowering the reactor pressure to 100 mbar, with the nitrogen stream left at 10 standard l/h. 20 g of product sample were taken from the uppermost layer in each case after 2, 4 and 8 hours.

Carrying out the experiment in the above batch arrangement enables the conditions of continuous operation to be simulated in the upper part of a reactor. In both cases, the gas firstly flows through a defined amount of product, with the concentration of the ethylene glycol liberated and water from the SSP reaction increasing. Under these conditions, a representative R value for the product located at the top in batch operation can be calculated from:

$$R = \frac{\text{gas flow amount} \cdot \text{density of the gas} \cdot \text{time}}{\text{mass of product}}$$

(density of $N_2$=1.25 kg/m$^3$)

The R value divided by the pressure applied in the reactor gives the S value.

A reaction rate (IV increase per square root of time) can be calculated from the IV values for each time interval:

$$\text{Reaction rate} = \frac{IV \text{ increase}}{\sqrt{t}}$$

The following values were obtained:

TABLE 1

| Residence time (SSP) | R value | S value [1/bar] | IV [dl/g] | IV rate [dl/g/h$^{0.5}$] |
|---|---|---|---|---|
| 0 h | | | 0.640 | |
| 2 h | 0.011 | 0.11 | 0.674 | 0.024 |
| 4 h | 0.023 | 0.23 | 0.719 | 0.077 |
| 8 h | 0.045 | 0.45 | 0.795 | 0.092 |

COMPARATIVE EXAMPLE 1

Example 1 was repeated using the same starting material under the same process conditions, but with the exception that only 1 standard l/h of hot nitrogen was fed in and that the reaction was carried out at an SSP temperature of 208° C.

The following values were obtained

TABLE 2

| Residence time (SSP) | R value | S value [1/bar] | IV [dl/g] | IV rate [dl/g/h$^{0.5}$] |
|---|---|---|---|---|
| 0 h | | | 0.644 | |
| 2 h | 0.0011 | 0.011 | 0.676 | 0.023 |

TABLE 2-continued

| Residence time (SSP) | R value | S value [1/bar] | IV [dl/g] | IV rate [dl/g/h^0.5] |
|---|---|---|---|---|
| 4 h | 0.0023 | 0.023 | 0.702 | 0.044 |
| 8 h | 0.0045 | 0.045 | 0.756 | 0.065 |

Compared to Example 1, lower IV rates are achieved as a result of the lower R values despite the higher SSP temperature which should actually lead to higher IV increase rates.

If the IV rates are converted to a temperature of 205° C. (basis: halving the reaction rate for a decrease of 13° C. in the temperature), the following values are obtained:

TABLE 3

| Residence time (SSP) | IV rate [dl/g/h^0.5] |
|---|---|
| 0 h | |
| 2 h | 0.020 |
| 4 h | 0.038 |
| 8 h | 0.056 |

It can be seen from this that R values and S values below the range according to the invention lead to a slower SSP reaction.

COMPARATIVE EXAMPLE 2

Example 1 was repeated using the same starting material under the same process conditions, but with the exception that 400 standard l/h of hot nitrogen were fed in and that the pressure was left at atmospheric pressure (1000 mbar).
The following values were obtained

TABLE 4

| Residence time (SSP) | R value | S value [1/bar] | IV [dl/g] | IV rate [dl/g/h^0.5] |
|---|---|---|---|---|
| 0 h | | | 0.647 | |
| 2 h | 0.45 | 0.45 | 0.701 | 0.038 |
| 4 h | 0.91 | 0.91 | 0.742 | 0.070 |
| 8 h | 1.82 | 1.82 | 0.819 | 0.093 |

Compared to Example 1, no increased IV rates were achieved at an SSP reaction for 4 and 8 hours despite the very high R values and S values which correspond to the conditions of an SSP reaction using nitrogen as process gas in accordance with the prior art.

It can be seen from this that although the amount of gas, which was 40 times that in Example 1, represents an economic disadvantage, it does not lead to an advantageous process.

COMPARATIVE EXAMPLE 3

Example 1 was repeated using the same starting material under the same process conditions, but with the exception that 40 standard l/h of hot nitrogen were fed in and the pressure was left at atmospheric pressure (1000 mbar).

The following values were obtained:

TABLE 5

| Residence time (SSP) | R value | S value [1/bar] | IV [dl/g] | IV rate [dl/g/h^0.5] |
|---|---|---|---|---|
| 0 h | | | 0.645 | |
| 2 h | 0.045 | 0.045 | 0.671 | 0.018 |
| 4 h | 0.091 | 0.091 | 0.704 | 0.056 |
| 8 h | 0.182 | 0.182 | 0.768 | 0.077 |

Compared to Example 1, lower IV rates were achieved because of the lower S values despite the higher R value which is still above the range according to the invention.

It can be seen from this that pressures above the range according to the invention and thus S values below the range according to the invention lead to a slower SSP reaction.

Compared to Comparative Example 2, lower IV rates are achieved because of the lower R values and S values.

It can be seen from this that in a nitrogen SSP according to the prior art, a reduction in the R value leads to a slower SSP reaction.

The invention claimed is:

1. A process for a solid-state polycondensation of polyesters, the process comprising:
   carrying out the solid-state polycondensation using polyester prepolymer particles having an intrinsic viscosity of from 0.35 to 0.80 dl/g and having an average pellet size in the range from 0.1 mm to 10 mm, in a reaction space in which an absolute pressure in the range from 10 mbar to 200 mbar and a process gas flow in the R value range from 0.005 to 0.05 is set,
   where the R value is defined as a ratio of hourly amount of process gas (in Kg) flowing through the reaction space to hourly amount of polymer (in kg) flowing through the reaction space:

$$R = \frac{m(gas)/h}{m(polymer)/h};$$

and
   carrying out the solid-state polycondensation over a period of time from 2 to 30 hours at a temperature of from 180° C. to 5° below a crystalline melting point of the polyester prepolymer particles so that a resulting polyester has an intrinsic viscosity from 0.70 to 0.95 dl/g, and an increase in the intrinsic viscosity, during solid-state polycondensation, is at least 0.05 dl/g.

2. The process as claimed in claim 1, wherein an S value of at least 0.3 is set in the reaction space, where the S value is defined as $$S = \frac{R}{\text{absolute pressure(bar)}} = \frac{m(gas)/h}{m(polymer)/h \cdot \text{absolute pressure(bar)}}.$$

3. The process as claimed in claim 1, wherein the process gas is nitrogen.

4. The process as claimed in claim 3, wherein the process gas, prior to being introduced into the reaction space, is first used as a cooling medium in a cold trap located upstream of a vacuum system for condensing out any material which may be harmful to the vacuum system, and the vacuum system is used to set the absolute pressure in the reaction space.

5. The process as claimed in claim 1, wherein the polyester prepolymer particles have a degree of crystallization of at least 25% before entering the reaction space.

6. The process as claimed in claim 1, wherein a solid-state polycondensation using polyethylene terephthalate is carried out in a temperature range of from 190° C. to 240° C.

7. A process for a solid-state polycondensation of polyesters, the process comprising:
carrying out the solid-state polycondensation using polyester prepolymer particles having an intrinsic viscosity of above 0.45 dl/g and below 0.75 dl/g, and having an average pellet size in the range from 0.5 mm to 3 mm, in a reaction space in which an absolute pressure in the range from 10 mbar to 200 mbar and a process gas flow in the R value range from 0.005 to 0.05 is set,
where the R value is defined as a ratio of hourly amount of process gas (in Kg) flowing through the reaction space to hourly amount of polymer (in kg) flowing through the reaction space:

$$R = \frac{m(\text{gas})/h}{m(\text{polymer})/h};$$

and
carrying out the solid-state polycondensation over a period of time from 2 to 30 hours at a temperature of from 180° C. to 5° below a crystalline melting point of the polyester prepolymer particles, so that a resulting polyester has an intrinsic viscosity from 0.70 to 0.95 dl/g, and an increase in the intrinsic viscosity, during solid-state polycondensation, is at least 0.05 dl/g.

8. A process for a solid-state polycondensation of polyesters, the process comprising:
carrying out the solid-state polycondensation using polyester prepolymer particles having an intrinsic viscosity above 0.5 dl/g and below 0.70 dl/g, and having an average pellet size in the range from 0.85 to 2.5 mm, in a reaction space in which an absolute pressure in the range from 10 mbar to 200 mbar and a process gas flow in the R value range from 0.005 to 0.05 is set,
where the R value is defined as a ratio of hourly amount of process gas (in Kg) flowing through the reaction space to hourly amount of polymer (in kg) flowing through the reaction space:

$$R = \frac{m(\text{gas})/h}{m(\text{polymer})/h};$$

and
carrying out the solid-state polycondensation over a period of time from 2 to 30 hours at a temperature of from 180° C. to 5° below a crystalline melting point of the polyester prepolymer particles, so that a resulting polyester has an intrinsic viscosity from 0.75 to 0.95 dl/g, and an increase in the intrinsic viscosity, during solid-state polycondensation, is at least 0.1 dl/g.

\* \* \* \* \*